United States Patent
Fukuoka et al.

(10) Patent No.: US 7,294,303 B2
(45) Date of Patent: Nov. 13, 2007

(54) BROAD BAND-CHOLESTERIC LIQUID CRYSTAL FILM AND PROCESS FOR PRODUCING THE SAME, CIRCULARLY POLARIZING PLATE, LINEARLY POLARIZING ELEMENT, ILLUMINATOR, AND LIQUID-CRYSTAL DISPLAY

(75) Inventors: Takahiro Fukuoka, Ibaraki (JP); Naoki Takahashi, Ibaraki (JP); Kazutaka Hara, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/542,065

(22) PCT Filed: Jan. 8, 2004

(86) PCT No.: PCT/JP2004/000053

§ 371 (c)(1),
(2), (4) Date: Jul. 11, 2005

(87) PCT Pub. No.: WO2004/063778

PCT Pub. Date: Jul. 29, 2004

(65) Prior Publication Data

US 2006/0119783 A1    Jun. 8, 2006

(30) Foreign Application Priority Data

Jan. 10, 2003   (JP) .............................. 2003-004346

(51) Int. Cl.
*C08F 2/48* (2006.01)
(52) U.S. Cl. .......................... 264/494; 430/20; 522/2; 349/115; 349/176; 252/299.01; 428/1.3; 294/496

(58) Field of Classification Search ................ 428/1.1, 428/1.3; 252/585, 299.01; 349/96, 98, 113, 349/115, 176, 194, 118; 430/20; 522/1–2; 264/494, 496
See application file for complete search history.

(56) References Cited

U.S. PATENT DOCUMENTS

| | | |
|---|---|---|
| 5,506,704 A | 4/1996 | Broer et al. |
| 5,691,789 A | 11/1997 | Li et al. |
| 6,061,108 A * | 5/2000 | Anderson et al. ............. 349/98 |

(Continued)

FOREIGN PATENT DOCUMENTS

EP    0 606 940 B1    4/1999

(Continued)

OTHER PUBLICATIONS

Japanese Office Action dated May 8, 2007 (mailing date), issued in corresponding Japanese Patent Application No. 2003-004346.

*Primary Examiner*—Rena Dye
*Assistant Examiner*—Sow-Fun Hon
(74) *Attorney, Agent, or Firm*—Westerman, Hattori, Daniels & Adrian, LLP.

(57) ABSTRACT

A broad band cholesteric liquid crystal film of the present invention comprises a cholesteric liquid crystal film obtained by polymerizing a liquid crystal mixture containing a polymerizable mesogen compound (a), a polymerizable chiral agent (b) and a photopolymerization initiator (c) between two substrates with ultraviolet light, and has a reflection bandwidth of 200 nm or more. The broad band cholesteric liquid crystal film of the present invention has a broad reflection band and is excellent in durability.

10 Claims, 4 Drawing Sheets

U.S. PATENT DOCUMENTS

| | | | |
|---|---|---|---|
| 6,088,077 A * | 7/2000 | De Wit et al. | 349/117 |
| 6,088,079 A * | 7/2000 | Kameyama et al. | 349/185 |
| 6,099,758 A | 8/2000 | Verrall et al. | |
| 6,175,400 B1 * | 1/2001 | Duncan et al. | 349/98 |
| 6,319,963 B1 * | 11/2001 | Coates et al. | 522/1 |
| 6,515,785 B1 * | 2/2003 | Cobb et al. | 359/247 |
| 6,573,963 B2 * | 6/2003 | Ouderkirk et al. | 349/117 |
| 6,805,920 B2 * | 10/2004 | Nakano et al. | 428/1.1 |
| 7,011,913 B2 * | 3/2006 | Teranishi et al. | 430/20 |
| 7,075,598 B2 * | 7/2006 | Umeya | 349/98 |
| 2003/0072893 A1 | 4/2003 | Nakano et al. | |

FOREIGN PATENT DOCUMENTS

| | | |
|---|---|---|
| JP | 6-281814 | 10/1994 |
| JP | 0881 509 A2 * | 12/1998 |
| JP | 11-248943 | 9/1999 |
| JP | 11-512849 | 11/1999 |
| JP | 3272668 | 1/2002 |
| JP | 2002265421 A | 9/2002 |
| JP | 2002-308832 | 10/2002 |
| JP | 2003-262732 | 9/2003 |
| WO | WO 98/38547 | 9/1998 |

* cited by examiner

BROAD BAND-CHOLESTERIC LIQUID CRYSTAL FILM AND PROCESS FOR PRODUCING THE SAME, CIRCULARLY POLARIZING PLATE, LINEARLY POLARIZING ELEMENT, ILLUMINATOR, AND LIQUID-CRYSTAL DISPLAY

TECHNICAL FIELD

The present invention relates to a broad band cholesteric liquid crystal film and a manufacturing method therefor. A broad band cholesteric liquid crystal film of the present invention is useful as a circularly polarizing plate (a reflection polarizer). The present invention relates to a linearly polarizer, a luminaire and a liquid crystal display using the circularly polarizing plate.

BACKGROUND ART

Generally, a liquid crystal display has a structure in which a space between glass plates forming transparent electrodes is filled with a liquid crystal and polarizers are arranged before and after the glass plates. A polarizer used in such a liquid crystal display is manufactured in a procedure in which iodine or a dichloic dye is subjected to be adsorbed to a polyvinyl alcohol film and the film is stretched in a given direction. The polarizer thus manufactured itself absorbs light vibrating in one direction and transmits only light vibrating in the other direction therethrough to thereby produce linearly polarizing light. Therefore, an efficiency of the polarizer could not exceed 50% theoretically, which works as the greatest factor to reduce an efficiency of a liquid crystal display. As the matters worse about the absorbed light, if a liquid crystal display is operated with an increased output of a light source beyond a level, it results in inconveniences that a polarizer is broken down by heat generation due to thermal conversion of absorbed light or that a display quality is degraded under thermal influence onto liquid crystal layer in a cell.

A cholesteric liquid crystal having a circularly polarized light separating function has a selective reflection characteristic reflecting only circularly polarized light having a direction thereof coinciding with a helical rotation direction of the liquid crystal and a wavelength equal to a helical pitch length of the liquid crystal. With this selective reflection characteristic used, only a specific circularly polarizing light of natural light in a given wavelength band is transmission-separated and the other light components are reflected and recycled, thereby enabling a polarizing film with a high efficiency to be manufactured. In the context, transmitted circularly polarized light passes through a λ/4 plate and thereby converted to linearly polarizing light, and coincidence of a direction of the linearly polarized light with a transmission direction of an absorption polarizer used in a liquid crystal display enables a liquid crystal display with a high transmittance to be realized. That is, in a case where a cholesteric liquid crystal film is combined with a λ/4 plate and the combination is used as a linearly polarizer, the linearly polarizer could achieve a brightness twice as that of a conventional absorption polarizer singly used, which absorbs 50% of incident light, due to no light loss theoretically.

There has been, however, difficulty in covering all the range of visible light, since a selective reflection characteristic of a cholesteric liquid crystal is restricted to only a specific wavelength band. A selective reflection wavelength bandwidth Δλ is expressed by following formula:

$$\Delta\lambda = 2\lambda \cdot (n_e - n_o)/(n_e + n_o)$$

where $n_o$: ordinary light refractive index of a cholesteric liquid crystal molecule, ne: extraordinary light refractive index of the cholesteric liquid crystal molecule, and λ: central wavelength in selective reflection.

The selective reflection wavelength bandwidth Δλ depends on a molecular structure of the cholesteric liquid crystal itself. According to the above formula, if $(n_e - n_o)$ is larger, a selective reflection wavelength bandwidth Δλ can be broader, while $(n_e - n_o)$ is usually 0.3 or less. With this value being larger, other functions as a liquid crystal (such as alignment characteristic, a liquid crystal temperature or the like) becomes insufficient, causing its practical use to be difficult. Therefore, a selective reflection wavelength bandwidth Δλ has been actually about 150 nm at highest. A cholesteric liquid crystal available in practical aspect has had a selective reflection wavelength bandwidth Δλ only in the range of about 30 to 100 nm in many cases.

A selective reflection central wavelength λ is given by the following formula:

$$\lambda = (n_e + n_o)P/2$$

where P: helical pitch length required for one helical turn of cholesteric liquid crystal.

With a given pitch length, a selective reflection central wavelength λ depends on an average refractive index and a pitch length of a liquid crystal molecule.

Therefore, in order to cover all the range of visible light, there have been adopted methods, in one of which plural layers having respective different selective reflection central wavelengths are laminated, and in another of which a pitch length is continuously changed in the thickness direction to thereby form a positional distribution of selective reflection central wavelengths.

For example, there can be exemplified a method in which a pitch length is continuously changed in the thickness direction (for example, see a publication of JP-A No. 6-281814, a specification of JP No. 3272668 and a publication of JP-A No. 11-248943). This method is such that when a cholesteric liquid crystal composition is ultraviolet exposure-cured, exposure intensities on sides of exposure and light emission are differentiated therebetween to alter a polymerization speed therebetween, which provides a change in compositional ratio of a liquid crystal composition having a different reaction speed in the thickness direction.

The bottom line of this method lies in that exposure intensities on sides of exposure and light emission are greatly different therebetween. Therefore, in many of the examples of the prior art described above, there has been adopted a method in which an ultraviolet absorbent is mixed into a liquid crystal composition so as to cause absorption thereof in the thickness direction to thereby amplify a difference in exposure dosage according to an optical path length.

A cholesteric liquid crystal film obtained by supplementary examining the prior art described above, however, showed a phenomenon that during a durability test (a heating test or a humidification test), an ultraviolet absorbent is precipitated on the surface of the cholesteric liquid crystal film or on the laminating interface to another layer. It is estimated that the ultraviolet absorbent move in the film and cohered in a long-term durability test because of the low molecular thereof. For use in general industrial materials, such the precipitation on the surface is not recognized as a wrong appearance, or even upon precipitation on the interface is not so problematic as to cause interfacial release. However, the cholesteric liquid crystal film used in a liquid crystal display is positioned in a light path of strong transmitted light, so that when such precipitations are generated, the precipitated particles are not only directly visualized, but also cause optical problems such as a reduction in the efficiency of utilization of light due to cancellation of polarized light by the precipitations, a change in light scatter distribution of a light source due to haze generated by the precipitations.

Insofar as the cholesteric liquid crystal film is used in an ordinary temperature atmosphere, generation of these precipitations is originally hardly brought about. However, when the cholesteric liquid crystal film is integrated and used in a liquid crystal display, a radiation heat from a light source in backlight is so strong that the precipitations of the ultraviolet absorbent is inevitable upon exposure to the heat for a long time. Such the precipitations when precipitated uniformly on the surface are hardly visible and hardly recognizable as defect, but the radiation heat from the light source varies highly on the surface of the liquid crystal display, and the precipitations are increased on only a region where the radiation heat was intensively applied, and are thus often recognized as irregularity on the surface. In addition, the required display brightness of liquid crystal displays in recent years is higher than 200 candelas, and the liquid crystal display on the side of the light source is exposed to light having an intensity of about 10,000 candelas. Depending on the temperature in the use environment, heat at about 40 to 60° C. is applied continuously to the liquid crystal display on the side of a light source. Accordingly, the precipitation of the ultraviolet absorbent was recognized not only in a heating reliability test but also in a continuous lighting test of the liquid crystal film mounted in a liquid crystal display. For example, if a UV-ray cured polymer obtained from a cholesteric liquid crystal composition blended with an ultraviolet absorbent is placed in an environment of 80° C.×500 hours or 60° C., 90% RH×500 hours, then cloudiness, an increase in haze, and precipitation of powder on the surface were significantly observed.

DISCLOSURE OF INVENTION

It is an object of the present invention to provide a broad band cholesteric liquid crystal film having a wide reflection band and a manufacturing method therefor. It is also an object of the present invention to provide a broad band cholesteric liquid crystal film having a wide reflection band, and excellent durability and a manufacturing method therefor.

It is another object of the present invention to provide a circularly polarizing plate using the broad band cholesteric liquid crystal film, and furthermore, to provide a linearly polarizer, a luminaire and a liquid crystal display using the circularly polarizing plate.

The present inventors have conducted serious studies in order to solve the problems with resultant findings that the objects can be achieved with the following broad band cholesteric liquid crystal film and a manufacturing method therefor, leading to completion of the present invention.

That is, the present invention is related to a broad band cholesteric liquid crystal film comprising: a cholesteric liquid crystal film obtained by polymerizing a liquid crystal mixture containing a polymerizable mesogen compound (a), a polymerizable chiral agent (b) and a photopolymerization initiator (c) between two substrates with ultraviolet light, and has a reflection bandwidth of 200 nm or more.

A broad band cholesteric liquid film of the present invention described above is obtained by polymerizing a polymerizable liquid crystal mixture and has a broad bandwidth of selective reflection wavelength not yet founded which is as broad as 200 nm or more. The reflection bandwidth is preferably 300 nm or more and more preferably 400 nm or more. A reflection bandwidth of 200 nm or more preferably lies in a visible light region, especially a wavelength region from 400 to 800 nm.

Note that a reflection bandwidth is a reflection band having reflectance of a half of the maximum reflectance in a reflectance spectrum of a broad band cholesteric liquid crystal film measured with a spectrophotometer (Instant Multiphotometry System Model No. MCPD-2000, manufactured by Otsuka Electronics Co., Ltd.).

In the above broad band cholesteric liquid crystal film, a pitch length in the cholesteric liquid crystal film preferably changes so as to narrow continuously from a side irradiated with ultraviolet light.

Also in the above broad band cholesteric liquid crystal film, preferably, the polymerizable mesogen compound (a) has one polymerizable functional group and the polymerizable chiral agent (b) has two or more polymerizable functional groups.

As disclosed by Broer et al. in Nature, 378, p. 467 (1995), a broad band cholesteric liquid crystal film diffusing a mesogen compound having chirality and changing the pitch continuously is obtained. In the present invention, on the other hand, a broad band cholesteric liquid crystal changing the pitch continuously is obtained by diffusing a mesogen compound having one polymerizable functional group, and thus the order of change of the chiral pitch is reversed. That is, a broad band cholesteric liquid crystal film having such pitch change as to narrow the pitch length continuously from the side of ultraviolet light irradiation can be obtained in the present invention. The pitch length is preferably changed such that the difference in pitch length between the side of ultraviolet light irradiation and the opposite side is made at least 100 nm. The pitch length was read from a sectional TEM image of the broad band cholesteric liquid crystal film.

The liquid crystal mixture forming the broad band cholesteric liquid crystal film may not contain an ultraviolet absorbent.

According to the present invention, a broad band cholesteric liquid crystal film having a broad reflection bandwidth can be obtained without using an ultraviolet absorbent. Accordingly, the broad band cholesteric liquid crystal film of this invention is free from an increase in haze, a reduction in transmittance of polarized light, and visualization of precipitated particles, caused by use of an ultraviolet absorbent, is excellent in durability in a heating/humidification environment, and is superior in reliability.

The molar absorption coefficient of the polymerizable mesogen compound (a) in the broad band cholesteric liquid crystal film is preferably 50 to 500 $dm^3 \cdot mol^{-1} \cdot cm^{-1}$ at 365 nm. The liquid crystal film having this molar absorption coefficient has an ability to absorb UV rays. The molar absorption coefficient is more preferably 100 to 250 $dm^3 \cdot mol^{-1} \cdot cm^{-1}$ at 365 nm. When the molar absorption coefficient is lower than 50 $dm^3 \cdot mol^{-1} \cdot cm^{-1}$ at 365 nm, the difference of the polymerization rate is small, thus it is hard to make the broad band liquid crystal film. On the other hand, when the molar absorption coefficient is higher than 500 dm³·mol⁻¹·cm⁻¹ at 365 nm, the polymerization does not completely progress, so curing may be not finished. The molar absorption coefficient is a value determined from absorbance at 365 nm in a measured spectrophotometric spectrum of each material.

The polymerizable mesogen compound (a) is preferably a compound represented by the following general formula (1):

wherein $R_1$ represents a hydrogen atom or a methyl group, and n is an integer of 1 to 5.

The present invention also related to a manufacturing method for the above broad band cholesteric liquid crystal film comprising steps of: polymerizing a liquid crystal mixture containing a polymerizable mesogen compound (a), a polymerizable chiral agent (b) and a photopolymerization initiator (c) between two substrates with ultraviolet light. The broad band cholesteric liquid crystal film of this invention can be produced by regulating the temperature, ultraviolet light intensity and irradiation time in ultraviolet light irradiation.

The present invention also related to a circularly polarizing plate comprising the above broad band cholesteric liquid crystal film.

The present invention also related to a linearly polarizer comprising the above circularly polarizing plate and a λ/4 plate laminating on the circularly polarizing plate. In the linearly polarizer, the circularly polarizing plate, which is the cholesteric liquid crystal film, preferably laminates on the λ/4 plate so that a pitch length in the film is narrowed toward the λ/4 plate continuously.

The present invention also related to a linearly polarizer comprising an absorption polarizer adhering to the above linearly polarizer so that a transmission axis direction of the absorption polarizer and a transmission axis of the above linearly polarizer are arranged in parallel with each other.

The λ/4 plate used in the linearly polarizer preferably satisfies that a Nz coefficient defined by formula (nx−nz)/(nx−ny) is −0.5 to −2.5 when in-plane major refractive indexes are nx and ny respectively and the major refractive index in the direction of thickness is nz.

The present invention also related to a luminaire comprising the above circularly polarizing plate or the above linearly polarizer on a front surface side of a surface light source having a reflective layer on the back surface side thereof.

The present invention further related to a liquid crystal display comprising a liquid crystal cell in a light emitting side of the above luminaire.

The linearly polarizer, the luminaire and the liquid crystal display can be used adhering the each forming layers wholly or partially to one another via an adhesive layer.

The broad band cholesteric liquid crystal film of this invention is used as a circularly polarizing plate and can give a linearly polarizer by combination with a λ/4 plate. Further, the liquid crystal display can improve reliability for example by combination with an absorption polarizer.

BEST MODE FOR CARRYING OUT THE INVENTION

A cholesteric liquid crystal film of the present invention is obtained by ultraviolet polymerizing a liquid crystal mixture containing a polymerizable mesogen compound (a), a polymerizable chiral agent (b) and a photopolymerization initiator (c).

A polymerizable mesogen compound (a) preferably has at least one polymerizable functional group and in addition, a mesogen group containing a ring unit and others. As polymerizable functional groups, exemplified are an acryloyl group, a methacryloyl group, an epoxy group, a vinyl ether group and others, among which preferable are an acryloyl group and a methacryloyl group. The broad band cholesteric liquid crystal film, as described above, the polymerizable mesogen compound (a) preferably has the molar absorption coefficient of 50 to 500 dm³·mol⁻¹·cm⁻¹ at 365 nm. As a polymerizable mesogen compound (a) having the above molar absorption coefficient, as described above, is a compound represented by the following general formula (1):

wherein $R_1$ represents a hydrogen atom or a methyl group, and n is an integer of 1 to 5.

As concrete examples of the above polymerizable mesogen compound (a), exemplified are the following compounds:

As a polymerizable chiral agent (b), exemplified is LC756 manufactured by BASF Corp.

A mixing amount of a polymerizable chiral agent (b) is preferably in the range of about from to 20 parts by weight and more preferably in the range of from 3 to 7 parts by weight relative to 100 parts by weight of a total amount of a polymerizable mesogen compound (a) and the polymerizable chiral agent (b). A helical twist power (HTP) is controlled by a ratio of a polymerizable mesogen compound (a) and a polymerizable chiral agent (b). By adjusting the proportion within the range, a reflection band can be selected so that a reflectance spectrum of an obtained cholesteric liquid crystal film can cover all the range of visible light.

Any kind of photopolymerization initiators (c) can be employed without imposing any specific limitation thereon.

Exemplified are IRGACURE 184, IRGACURE 907, IRGACURE 369, IRGACURE 651 and others manufactured by Chiba Specialty Chemicals Corp. A mixing amount of a photopolymerization initiator is preferably in the range of about from 0.01 to 10 parts by weight and more preferably in the range of from 0.05 to 5 parts by weight relative to 100 parts by weight of a total amount of a polymerizable mesogen compound (a) and a polymerizable chiral agent (b).

In the present invention, a liquid crystal mixture containing a polymerizable mesogen compound (a), a polymerizable chiral agent (b) and a photopolymerization initiator (c) can be used as a solution obtained by dissolving the mixture into a solvent. Without a specific limitation imposed, preferable as solvents used are methyl ethyl ketone, cyclohexanone, cyclopentanone and others. A concentration of a solution is usually in the range of about from 3 to 50 weight %.

Manufacture of a cholesteric liquid crystal film of the present invention is implemented by polymerizing the liquid crystal mixture between two substrates with ultraviolet light.

As substrates, there can be adopted conventionally known members as ones. Exemplified are: a rubbing film obtained by subjecting a thin film made of polyimide, polyvinyl alcohol or the like formed on a substrate to a rubbing treatment with rayon cloth; an obliquely deposition film; optically oriented film obtained by illuminating a polymer having photocrosslinking group such as cynnamate, azobenzene or the like or a polyimide with polarized ultraviolet; and a stretched film and others. Orientation can be implemented by application of a magnetic field, an electric field and a shearing stress.

Examples of the substrate that are used include: films made of plastics such as polyethylene phthalate, triacetyl cellulose, norbornen resin, polyvinyl alcohol, polyimide, polyallylate, polycarbonate, polysulfone, polyethersulfone and others; a glass plate, a quartz sheet and others.

A liquid crystal mixture described above is coated on one substrate and thereafter, the other substrate is laminated on the coat. In case where the liquid crystal mixture is a solution, the solution is coated on one substrate and the coat is dried, followed by laminating the other substrate on the coat. A drying temperature for evaporating a solvent has only to be a temperature of the boiling temperature of the solvent or higher. The temperature is only required to be set usually in the range of 80 to 160° C. according to a kind of a solvent.

The coating thickness of the liquid crystal mixture (or in the case of a solution, the coating thickness after removing a solvent by drying) is preferably about 5 to 20 µm, more preferably about 7 to 12 µm. When the coating thickness is less than 5 µm, a helical pitch enough to cover a reflection bandwidth of 200 nm or more may not be able to formed, while when the coating thickness is more than 20 µm, the orientation regulating force may not sufficiently act, resulting in imperfect orientation.

The polymerization temperature in ultraviolet light irradiation is generally preferably 140° C. or less. Specifically, the polymerization temperature is preferably about 60 to 140° C., more preferably 80 to 120° C. In heating, there is an effect of accelerating the rate of diffusion of the monomer component. When the temperature is lower than 60° C., the rate of diffusion of the polymerizable mesogen compound (a) is very low, thus requiring a very long time to make a broad band liquid crystal film.

The ultraviolet light intensity is preferably 0.1 to 20 mW/cm$^2$, more preferably 1 to 10 mW/cm$^2$. It is not preferable that the ultraviolet light intensity is higher than 20 mW/cm$^2$, because the rate of polymerization reaction becomes higher than the rate of diffusion, thus failing to make a broad band liquid crystal film. The irradiation time is a time as short as 5 minute or less, preferably 3 minutes or less, extremely preferably 1 minute or less.

A thus obtained cholesteric liquid crystal film may be used either not being separated from a substrate or being separated therefrom.

A broad band cholesteric liquid crystal film of the present invention is used as a circularly polarizing plate. A circularly polarizing plate with a λ/4 plate laminated thereon can be used as a linearly polarizer. A cholesteric liquid crystal film, which is a circularly polarizing plate, is preferably laminated on a λ/4 plate so that a pitch length in the film is narrowed toward the λ/4 plate continuously.

The λ/4 plate is preferable that a Nz coefficient defined by formula (nx−nz)/(nx−ny) satisfies −0.5 to −2.5 when in-plane major refractive indexes are nx and ny respectively and the major refractive index in the direction of thickness is nz.

As λ/4 plates, exemplified are: a birefringent film obtained by stretching a film made of a proper plastic such as polycarbnate, norbornen resin, polyvinyl alcohol, polystyrene, polymethylmethacrylate, polypropylene, other polyolefins, polyallylate, polyimide; a aligned film made of a liquid crystal material such as a liquid crystal polymer; an aligned layer of a liquid crystal material supported by a film; and others. A thickness of a λ/4 plate is usually preferably in the range of from 0.5 to 200 µm and especially preferably in the range of from 1 to 100 µm.

A retardation plate functioning as a λ/4 plate in a broad wavelength range such as a visible light region can be obtained, for example, by a scheme to superimpose a retardation layer functioning as a λ/4 plate for a monochromatic light of wavelength of 550 nm and a retardation layer exhibiting another retardation characteristic, for example a retardation layer functioning as a λ/2 plate on each other or the like scheme. Therefore, a retardation plate arranged between a polarizing plate and a brightness enhancement improving film may be made of either one retardation layer, or two or more retardation layers.

An absorption polarizer is adhered to the linearly polarizer, so that a transmission axis direction of the linearly polarizer are arranged in parallel with each other.

The polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film containing dichromatic materials such as iodine is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A polarizing plate on which a transparent protective film prepared on one side or both sides of the polarizer is used. Materials of the transparent protective, excellent in transparency, mechanical strength, heat stability, water shielding property, isotropy etc., is may be preferably used. As transparent protective films, for example, transparent polymer films made of polyester type polymers, such as polyethylene terephthalate and polyethylenenaphthalate; cellulose type polymers, such as diacetyl cellulose and triacetyl cellulose; polycarbonate type polymer; acrylics type polymer, such as poly methylmethacrylate may be mentioned. Besides, as examples of the transparent polymer films made of styrene type polymers, such as polystyrene and acrylonitrile-styrene copolymer; polyolefin type polymers, such as polyethylene, polypropylene, polyolefin that has cyclo-type or norbornen structure, ethylene-propylene copolymer; vinyl chloride type polymer; amide type polymers, such as nylon and aromatic polyamide may be mentioned. Besides, as examples of the transparent polymer films made of imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially, preferable when being used is a film made of a transparent polymer with less of optical birefringence. Preferable from the viewpoint of a protective film for a polarizing plate are triacetyl cellulose, polycarbonate, acrylics type polymer, a cyclo-olefine type resin, polyolefin having a norbornen structure and others.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a transparent protective film preferably used, in viewpoint of polarization property and durability, triacetyl cellulose film whose surface is saponificated with alkali is suitable. In general, a thickness of a transparent protective film is about from 10 to 500 μm, preferably from 20 to 300 μm, and especially preferably from 30 to 200 μm.

Moreover, it is preferable that the transparent protective film may have as little coloring as possible. Accordingly, a protective film having a retardation value in a film thickness direction represented by $Rth=[(nx+ny)/2-nz] \times d$ of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of from −90 nm to +75 nm in a thickness direction. The retardation value (Rth) in a thickness direction is preferably from −80 nm to +60 nm, and especially preferably from −70 nm to +45 nm.

The transparent protective films on the front and back sides may also be transparent protective films made of either the same polymer material or respective different polymer materials.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight part. An anti glare layer may serve as a diffusion layer (viewing angle magnifying function etc.) for diffusing transmitting light through the polarizing plate and magnifying a viewing angle etc.

In addition, the above-mentioned antireflection layer, sticking prevention layer, diffusion layer, anti glare layer, etc. may be built in the protective film itself, and also they may be prepared as an optical layer different from the protective layer.

Lamination of the linearly polarizer and further lamination of various kinds of optical layers can be carried out in a system of laminating such layers successively in the process for producing a liquid crystal display etc., but the previously laminated layers have advantages such as excellent quality stability, assembling operation etc. and improvement in the process for producing a liquid crystal display etc. In lamination, a suitable adhesion means such as a pressure sensitive adhesive layer etc. can be used. In this adhesion, the optical axis thereof can have a suitable arrangement angle depending on intended retardation characteristics.

The linearly polarizer described above can be provided with a pressure sensitive adhesive layer for adhering itself to another member such as a liquid crystal cell or the like. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition to the above description, a pressure sensitive adhesive layer low in moisture absorption rate and excellent in heat resistance is preferable from the viewpoints of prevention of a foaming phenomenon and peeling-off phenomenon due to moisture absorption, prevention of degradation in optical characteristic and warp of a liquid crystal cell due to the difference of thermal expansion or the like and further, in consideration of formability of a high quality liquid crystal display excellent in durability and the like.

The pressure sensitive adhesive layer may contain additives, for example, such as natural or synthetic resins, tackifier, glass fibers, glass beads, metal powder, fillers comprising other inorganic powder etc., pigments, colorants and antioxidants. Moreover, it may be a pressure sensitive adhesive layer that contains fine particle and shows optical diffusion nature.

Proper method may be carried out to attach a pressure sensitive adhesive layer. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizer using suitable developing methods, such as flow method and coating method, or a method in which an adhesive layer is once formed on a separator, as mentioned above, and is then transferred on a an optical film may be mentioned. A pressure sensitive adhesive layer may be prepared with two or more layers which are made of different compositions or kinds with each layer. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of a pressure sensitive adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, ultraviolet absorbing property may be given to the above-mentioned each layer, such as a pressure sensitive adhesive layer, using a method of adding ultraviolet absorbents, such as salicylic acid ester type compounds, benzophenol type compounds, benzotriazol type compounds, cyano acrylate type compounds, and nickel complex salt type compounds.

A linearly polarizer of the present invention can be preferably used in manufacture of various kinds of apparatuses such as a liquid crystal display and others. Assembling of a liquid crystal display may be carried out according to conventional methods. That is, a liquid crystal display is generally manufactured by suitably assembling several parts such as a liquid crystal cell, optical elements and, if necessary, lighting system, and by incorporating driving circuit. In the present invention, except that a linearly polarizer by the present invention is used; there is especially no limitation to use any conventional methods. Also any liquid crystal cell of arbitrary type, such as TN type, and STN type, π type may be used.

Suitable liquid crystal displays, such as liquid crystal display with which the above-mentioned linearly polarizer has been located at one side or both sides of the liquid crystal cell, and with which a backlight or a reflector is used for a lighting system may be manufactured. In this case, the linearly polarizer by the present invention may be installed in one side or both sides of the liquid crystal cell. When installing the linearly polarizers in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

Hereinafter, the present invention is described in more detail by reference to the Examples and Comparative Examples, but the present invention is not limited to these examples.

In the Examples, the following compound was used as the polymerizable mesogen compound (a).

The molar absorption coefficient was 220 $dm^3 \cdot mol^{-1} \cdot cm^{-1}$ at 365 nm. And, as the polymerizable chiral agent (b), LC756 manufactured by BASF Ltd. was used.

Example 1

A methyl ethyl ketone solution (solids content 20% by weight) of a mixture consisting of 96 parts by weight of the polymerizable mesogen compound (a) shown above, 4 parts by weight of the polymerizable chiral agent (b) described above, and 5 parts by weight of Irgacure 184 (manufactured by Ciba Specialty Chemicals Co.) as the photopolymerization initiator (c) was prepared. The solution was cast onto a stretched polyethylene terephthalate substrate and dried at 80° C. for 2 minutes to remove the solvent; subsequently another polyethylene terephthalate substrate was laminated thereon. Subsequently under heating at 120° C., the sample was then irradiated with 3 mW/cm² ultraviolet light for 5 minutes to give the objective cholesteric liquid crystal film.

Figure 1:
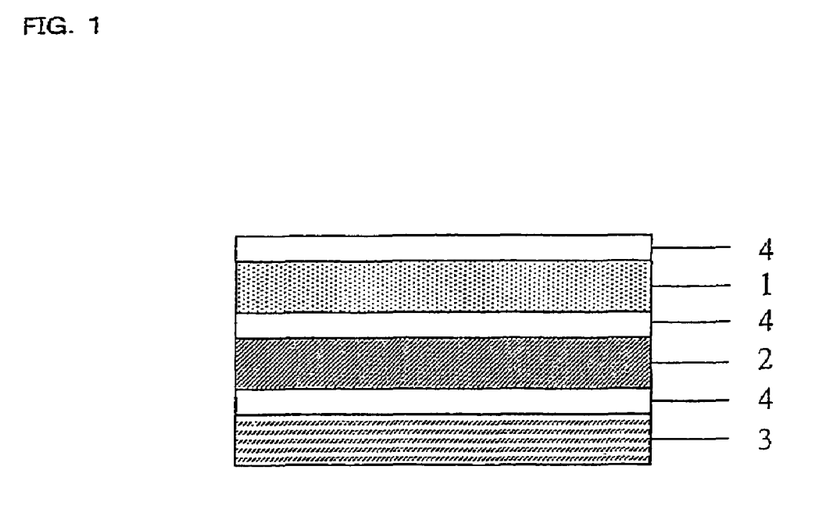
FIG. 1 is a conceptual view of a polarizing plate used in Example 1 to 3 and Comparative Example 1 to 3, wherein a numerical symbol (1) indicates an polarizing plate, (2) a λ/4 plate, (3) a cholesteric liquid crystal film (circularly polarizing plate), (4) a pressure sensitive adhesive layer.
Figure 2:
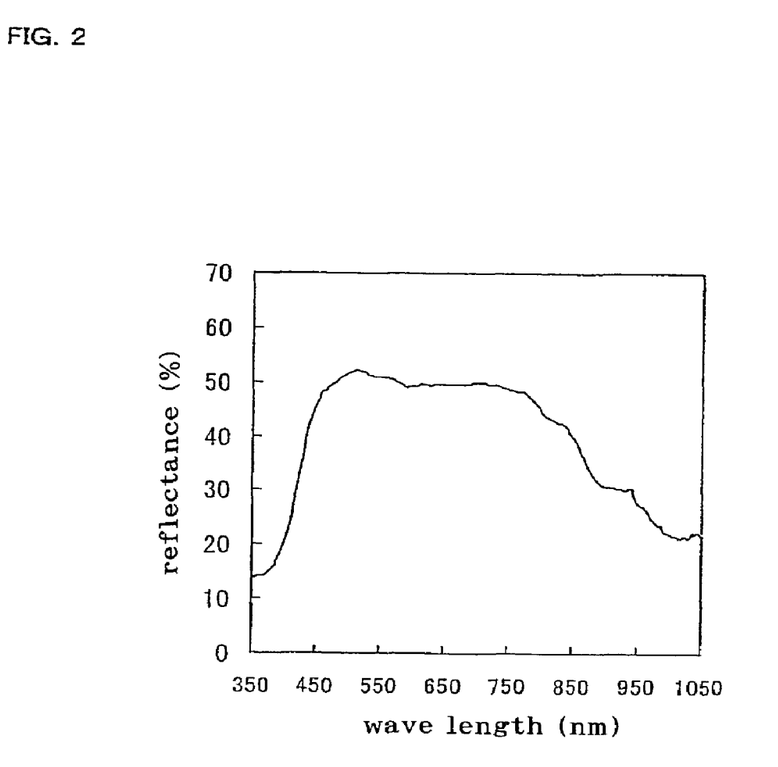
FIG. 2 is a reflectance spectrum of a cholesteric liquid crystal film manufactured in Example 1.

The polyethylene terephthalate substrate in the side opposite to the side of ultraviolet light irradiation was removed. A reflection spectrum of this cholesteric liquid crystal film (circularly polarizing plate) is shown in FIG. 2. The circularly polarizing plate had an excellent property of separating circularly polarized light (reflection band) in the range of 430 to 860 nm. The total thickness of the cholesteric liquid crystal layer (film) was about 9 µm. The pitch length of the resulting cholesteric liquid crystal layer was 0.52 µm in the vicinity of the surface irradiated with ultraviolet light (layer lower by 1 µm from the surface irradiated with ultraviolet light), and 0.26 µm in the vicinity of the opposite surface (layer lower by 1 µm from the opposite surface).

On a wide viewing angle λ/4 plate (Nz coefficient =−1.2) obtained by biaxially stretching a polycarbonate resin film (thickness 80 µm), the resulting circularly polarizing plate was laminated via an acrylic pressure sensitive adhesive (thickness 25 µm) in such a direction as to narrow the pitch length continuously. Further, SEG1425DU (absorption type polarizing plate manufactured by Nitto Denko Corporation) was laminated thereon via a pressure sensitive adhesive, to give a broad band polarizing plate.

Example 2

A methyl ethyl ketone solution (solids content 20% by weight) of a mixture consisting of 96 parts by weight of the polymerizable mesogen compound (a) shown above, 4 parts by weight of the polymerizable chiral agent (b) described above, and 0.5 parts by weight of Irgacure 907 (manufactured by Ciba Specialty Chemicals Co.) as the photopolymerization initiator (c) was prepared. The solution was cast onto a stretched polyethylene terephthalate substrate and dried at 80° C. for 2 minutes to remove the solvent; subsequently another polyethylene terephthalate substrate was laminated thereon. Subsequently under heating at 120° C., the sample was then irradiated with 3 mW/cm$^2$ ultraviolet light for 5 minutes to give the objective cholesteric liquid crystal film.

Figure 3:
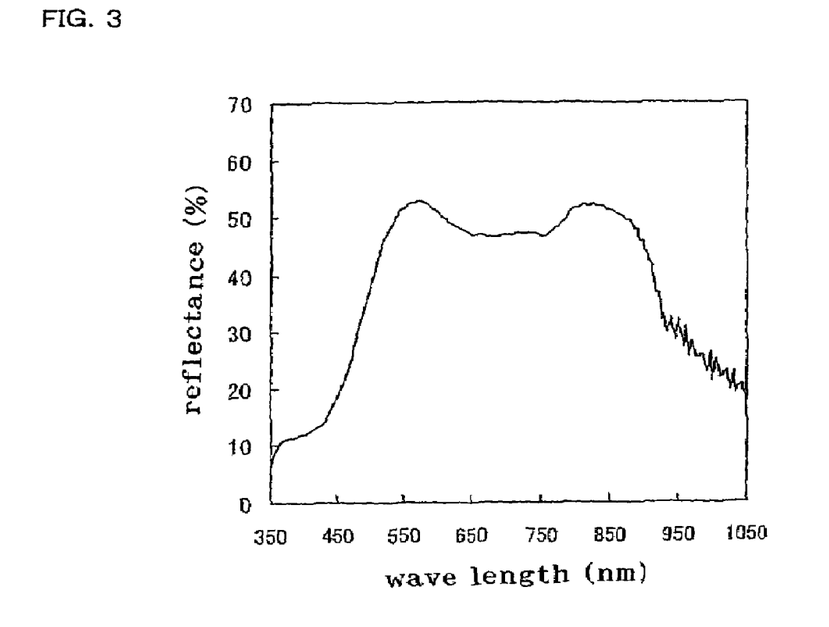
FIG. 3 is a reflectance spectrum of a cholesteric liquid crystal film manufactured in Example 2.

The polyethylene terephthalate substrate in the side opposite to the side of ultraviolet light irradiation was removed. A reflection spectrum of this cholesteric liquid crystal film (circularly polarizing plate) is shown in FIG. 3. The circularly polarizing plate had an excellent property of separating circularly polarized light (reflection band) in the range of 470 to 920 nm. The total thickness of the cholesteric liquid crystal layer (film) was about 10 µm. The pitch length of the resulting cholesteric liquid crystal layer was 0.56 µm in the vicinity of the surface irradiated with ultraviolet light (layer lower by 1 µm from the surface irradiated with ultraviolet light), and 0.28 µm in the vicinity of the opposite surface (layer lower by 1 µm from the opposite surface).

On a wide viewing angle λ/4 plate (Nz coefficient =−1.2) obtained by biaxially stretching a polycarbonate resin film (thickness 80 µm), the resulting circularly polarizing plate was laminated via an acrylic pressure sensitive adhesive (thickness 25 µm) in such a direction as to narrow the pitch length continuously. Further, SEG1425DU (absorption type polarizing plate manufactured by Nitto Denko Corporation) was laminated thereon via a pressure sensitive adhesive, to give a broad band polarizing plate.

Example 3

A methyl ethyl ketone solution (solids content 20% by weight) of a mixture consisting of 96 parts by weight of the polymerizable mesogen compound (a) shown above, 4 parts by weight of the polymerizable chiral agent (b) described above, and 0.05 parts by weight of Irgacure 369 (manufactured by Ciba Specialty Chemicals Co.) as the photopolymerization initiator (c) was prepared. The solution was cast onto a stretched polyethylene terephthalate substrate and dried at 80° C. for 2 minutes to remove the solvent, subsequently another polyethylene terephthalate substrate was laminated thereon. Subsequently under heating at 120° C., the sample was then irradiated with 11 mW/cm$^2$ ultraviolet light for 5 minutes to give the objective cholesteric liquid crystal film.

Figure 4:
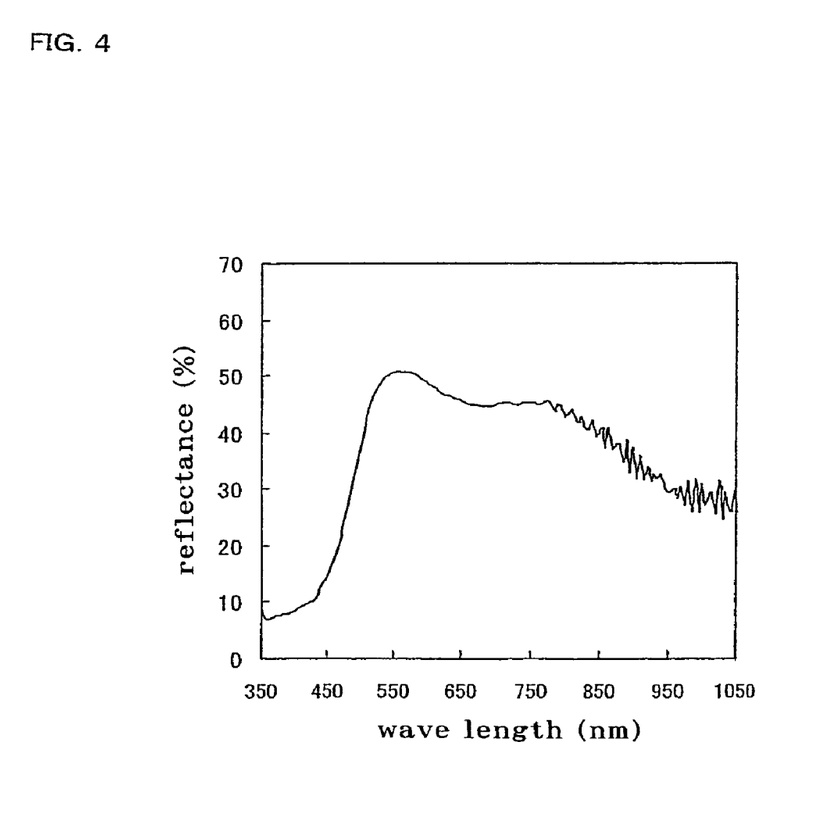
FIG. 4 is a reflectance spectrum of a cholesteric liquid crystal film manufactured in Example 3.

The polyethylene terephthalate substrate in the side opposite to the side of ultraviolet light irradiation was removed. A reflection spectrum of this cholesteric liquid crystal film (circularly polarizing plate) is shown in FIG. 4. The circularly polarizing plate had an excellent property of separating circularly polarized light (reflection band) in the range of 490 to 890 nm. The total thickness of the cholesteric liquid crystal layer (film) was about 9 µm. The pitch length of the resulting cholesteric liquid crystal layer was 0.54 µm in the vicinity of the surface irradiated with ultraviolet light (layer lower by 1 µm from the surface irradiated with ultraviolet light), and 0.30 µm in the vicinity of the opposite surface (layer lower by 1 µm from the opposite surface).

The resulting circularly polarizing plate was laminated on a λ/4 plate (NRF film, Δn=140 nm and Nz coefficient =−1.2, manufactured by Nitto Denko Corporation) in such a direction as to narrow the pitch length continuously, and a λ/2 plate (NRZ film, Δn=270 nm and Nz coefficient=0.5, viewing angle property compensation type, manufactured by Nitto Denko Corporation) was arranged thereon at 117.5:° relative to an axial angle of the λ/4 plate. An acrylic pressure sensitive adhesive (thickness 25 µm) was used in each lamination. The transmission polarization axis in this case was 100 relative to the axis of the λ/4 plate, and along this direction, SEG1425DU (absorption-type polarizer manufactured by Nitto Denko Corporation) was laminated thereon in a same manner to give a broad band polarizing plate.

Comparative Example 1

A methyl ethyl ketone solution (solids content 20% by weight) of a mixture consisting of 96 parts by weight of the polymerizable mesogen compound (a) shown above, 4 parts by weight of the polymerizable chiral agent (b) described above, and 5 parts by weight of Irgacure 184 (manufactured by Ciba Specialty Chemicals Co.) as the photopolymerization initiator (c) was prepared. The solution was cast onto a stretched polyethylene terephthalate substrate and dried at 80° C. for 2 minutes to remove the solvent; subsequently another polyethylene terephthalate substrate was laminated thereon. Subsequently under heating at 80° C., the sample was then irradiated with 50 mW/cm$^2$ ultraviolet light for 5 minutes to give the objective cholesteric liquid crystal film.

Figure 5:
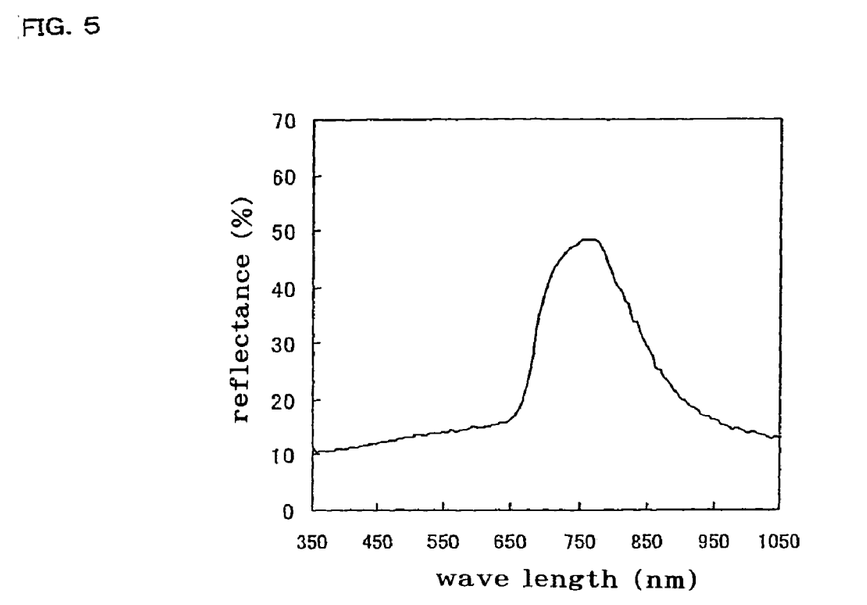
FIG. 5 is a reflectance spectrum of a cholesteric liquid crystal film manufactured in Comparative Example 1.

The polyethylene terephthalate substrate in the side opposite to the side of ultraviolet light irradiation was removed. A reflection spectrum of this cholesteric liquid crystal film (circularly polarizing plate) is shown in FIG. 5. The circularly polarizing plate had an excellent property of separating circularly polarized light (reflection band) in the range of 690 to 840 nm. The total thickness of the cholesteric liquid crystal layer (film) was about 9 µm. The pitch length of the resulting cholesteric liquid crystal layer was 0.50 µm in the vicinity of the surface irradiated with ultraviolet light (layer lower by 1 µm from the surface irradiated with ultraviolet light), and 0.50 µm in the vicinity of the opposite surface (layer lower by 1 µm from the opposite surface).

On a wide viewing angle λ/4 plate (Nz coefficient =−1.2) obtained by biaxially stretching a polycarbonate resin film (thickness 80 µm), the resulting circularly polarizing plate was laminated via an acrylic pressure sensitive adhesive (thickness 25 µm) in such a direction as to narrow the pitch length continuously. Further, SEG1425DU (absorption type polarizing plate manufactured by Nitto Denko Corporation)

was laminated thereon via a pressure sensitive adhesive, to give a broad band polarizing plate.

Comparative Example 2

A methyl ethyl ketone solution (solids content 20% by weight) of a mixture consisting of 96 parts by weight of the polymerizable mesogen compound (a) shown above, 4 parts by weight of the polymerizable chiral agent (b) described above, and 5 parts by weight of Irgacure 184 (manufactured by Ciba Specialty Chemicals Co.) as the photopolymerization initiator (c) was prepared. The solution was cast onto a stretched polyethylene terephthalate substrate and dried at 80° C. for 2 minutes to remove the solvent; subsequently another polyethylene terephthalate substrate was laminated thereon. Subsequently under heating at 40° C., the sample was then irradiated with 3 mW/cm² ultraviolet light for 5 minutes to give the objective cholesteric liquid crystal film.

Figure 6:
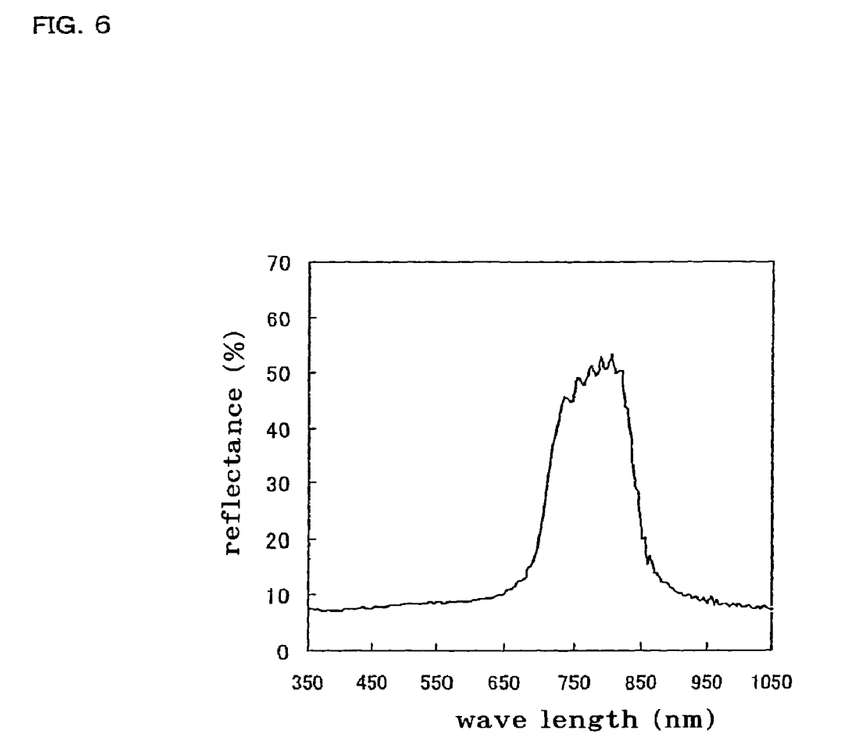
FIG. 6 is a reflectance spectrum of a cholesteric liquid crystal film manufactured in Comparative Example 2.

The polyethylene terephthalate substrate in the side opposite to the side of ultraviolet light irradiation was removed. A reflection spectrum of this cholesteric liquid crystal film (circularly polarizing plate) is shown in FIG. 6. The circularly polarizing plate had an excellent property of separating circularly polarized light (reflection band) in the range of 720 to 860 nm. The total thickness of the cholesteric liquid crystal layer (film) was about 9 μm. The pitch length of the resulting cholesteric liquid crystal layer was 0.52 μm in the vicinity of the surface irradiated with ultraviolet light (layer lower by 1 μm from the surface irradiated with ultraviolet light), and 0.52 μm in the vicinity of the opposite surface (layer lower by 1 μm from the opposite surface).

On a wide viewing angle λ/4 plate (Nz coefficient =−1.2) obtained by biaxially stretching a polycarbonate resin film (thickness 80 μm), the resulting circularly polarizing plate was laminated via an acrylic pressure sensitive adhesive (thickness 25 μm) in such a direction as to narrow the pitch length continuously. Further, SEG1425DU (absorption type polarizing plate manufactured by Nitto Denko Corporation) was laminated thereon via a pressure sensitive adhesive, to give a broad band polarizing plate.

Comparative Example 3

A methyl ethyl ketone solution (solids content 20% by weight) of a mixture consisting of 96 parts by weight of the polymerizable mesogen compound (a) shown above, 4 parts by weight of the polymerizable chiral agent (b) described above, 5 parts by weight of Irgacure 184 (manufactured by Ciba Specialty Chemicals Co.) as the photopolymerization initiator (c) and 1 part of Tinuvin 400 (manufactured by Ciba Specialty Chemicals Co., ultraviolet absorbent) was prepared. The solution was cast onto a stretched polyethylene terephthalate substrate and dried at 80° C. for 2 minutes to remove the solvent; subsequently another polyethylene terephthalate substrate was laminated thereon. Subsequently under heating at 80° C., the sample was then irradiated with 50 mW/cm² ultraviolet light for 5 minutes to give the objective cholesteric liquid crystal film.

Figure 7:
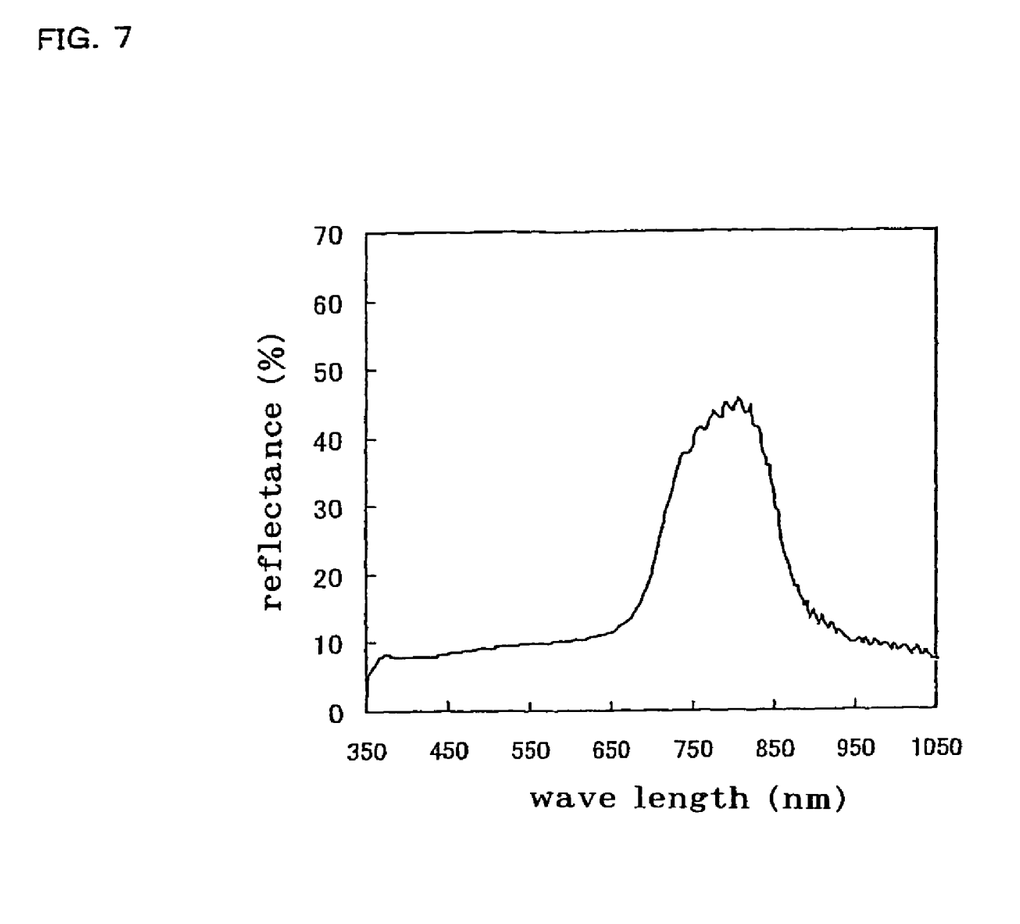
FIG. 7 is a reflectance spectrum of a cholesteric liquid crystal film manufactured in Comparative Example 3.

The polyethylene terephthalate substrate in the side opposite to the side of ultraviolet light irradiation was removed. A reflection spectrum of this cholesteric liquid crystal film (circularly polarizing plate) is shown in FIG. 7. The circularly polarizing plate had an excellent property of separating circularly polarized light (reflection band) in the range of 715 to 860 nm. The total thickness of the cholesteric liquid crystal layer (film) was about 9 μm. The pitch length of the resulting cholesteric liquid crystal layer was 0.51 μm in the vicinity of the surface irradiated with ultraviolet light (layer lower by 1 μm from the surface irradiated with ultraviolet light), and 0.51 μm in the vicinity of the opposite surface (layer lower by 1 μm from the opposite surface).

On a wide viewing angle λ/4 plate (Nz coefficient =−1.2) obtained by biaxially stretching a polycarbonate resin film (thickness 80 μm), the resulting circularly polarizing plate was laminated via an acrylic pressure sensitive adhesive (thickness 25 μm) in such a direction as to narrow the pitch length continuously. Further, SEG1425DU (absorption type polarizing plate manufactured by Nitto Denko Corporation) was laminated thereon via a pressure sensitive adhesive, to give a broad band polarizing plate.

The (broad band) polarizing plates obtained in the Example and Comparative Examples were evaluated as follows. The results are shown in Table 1.

(Brightness Enhancement Rate)

Brightness was measured when the (broad band) polarizing plate was amounted on a 15-inch TFT liquid crystal display, by using BM7 manufactured by TOPCON CORPORATION. The Brightness enhancement rate was magnification calculated from improved brightness as compared with brightness in the absence of the broad band cholesteric liquid crystal film.

(Viewing Angle Property: Color Tone Change)

The viewing angle property was evaluated with the following criteria, on the basis of Δxy determined by a viewing angle measuring meter EZ-CONTRAST manufactured by ELDIM Inc.

$$\Delta xy = ((x_0 - x_1)^2 + (y_0 - y_1)^2)^{0.5}$$

Front chromaticity $(x_0, y_0)$, 60° chromaticity $(x_1, y_1)$

Good: Color tone change Δxy at a viewing angle of 60° is 0.04 or less.

Not good: Color tone change Δxy at a viewing angle of 60° is 0.04 or more.

(Durability)

The broad band polarizing plate or the polarizing plate was placed for 500 hours in an environment of 80° C. and 60° C., 90% RH, and then the presence or absence of powdery substance precipitated on the surface was judged with naked eyes. When powdery substance is present, the plate is problematic in use for optical purposes.

TABLE 1

|  |  | Ex. 1 | Ex. 2 | Ex. 3 | Comp. Ex. 1 | Comp. Ex. 2 | Comp. Ex. 3 |
|---|---|---|---|---|---|---|---|
| Liquid crystal mixture | Polymerizable mesogen compound (a) | 96 | 96 | 96 | 96 | 96 | 96 |
|  | Polymerizable chiral agent (b) | 4 | 4 | 4 | 4 | 4 | 4 |
|  | Photopolymerization initiator (c) Irgacure 184 | 5 | 0 | 0 | 5 | 5 | 5 |
|  | Irgacure 907 | 0 | 0.5 | 0 | 0 | 0 | 0 |
|  | Irgacure 369 | 0 | 0 | 0.05 | 0 | 0 | 0 |

TABLE 1-continued

|  |  | Ex. 1 | Ex. 2 | Ex. 3 | Comp. Ex. 1 | Comp. Ex. 2 | Comp. Ex. 3 |
|---|---|---|---|---|---|---|---|
|  | Ultraviolet absorbent (Tinuvin 400) | 0 | 0 | 0 | 0 | 0 | 1 |
|  | Solvent (methyl ethyl ketone) | 400 | 400 | 400 | 400 | 400 | 400 |
| Polymerization conditions | Ultraviolet light intensity (mW/cm$^2$) | 3 | 3 | 11 | 50 | 3 | 50 |
|  | Temperature (° C.) | 120 | 120 | 120 | 80 | 40 | 80 |
| Cholesteric liquid crystal film | Reflection band (nm) | 430-860 | 470-920 | 490-890 | 690-840 | 720-860 | 715-860 |
|  | Reflection bandwidth (nm) | 430 | 450 | 400 | 150 | 140 | 145 |
|  | Pitch length (μm) Surface irradiated with ultraviolet light | 0.52 | 0.56 | 0.54 | 0.50 | 0.52 | 0.51 |
|  | Opposite surface | 0.26 | 0.28 | 0.30 | 0.50 | 0.52 | 0.51 |
| Evaluation | Brightness enhancement rate | 1.3 | 1.3 | 1.3 | 1.0 | 1.0 | 1.0 |
|  | Viewing angle property/color tone change | Good | Good | Good | Not good | Not good | Not good |
|  | Durability (presence or absence of precipitates) | Absent | Absent | Absent | Absent | Absent | Present |

INDUSTRIAL APPLICABILITY

The broad band cholesteric liquid crystal film of the present invention is useful as a circularly polarizing plate (reflective polarizer). The circularly polarizing plate can be utilized in a linearly polarizer, a luminaire, a liquid crystal display and the like.

The invention claimed is:

1. A manufacturing method for a broad band cholesteric liquid crystal film comprising: polymerizing a liquid crystal mixture that is free of an ultraviolet absorbent, containing a polymerizable mesogen compound (a), a polymerizable chiral agent (b) and a photopolymerization initiator (c) between two substrates, by irradiation of one side with ultraviolet light having an intensity of 1 to 20mW/cm$^2$, wherein the two substrates are made of the same material, the broad band cholesteric liquid crystal film has a reflection bandwidth of 300 nm or more, a pitch length in the cholesteric liquid crystal film changes so as to narrow continuously from a side irradiated with ultraviolet light, and the pitch length is changed such that the difference in pitch length between the side of ultraviolet light irradiation and the opposite side is made at least 100 nm.

2. The manufacturing method for a broad band cholesteric liquid crystal film according to claim 1, wherein the polymerizable mesogen compound (a) has one polymerizable functional group and the polymerizable chiral agent (b) has two or more polymerizable functional groups.

3. The manufacturing method for a broad band cholesteric liquid crystal film according to claim 1, wherein the molar absorption coefficient of the polymerizable mesogen compound (a) is 50 to 500 dm$^3$·mol$^{-1}$·cm$^{-1}$ at 365 nm.

4. The manufacturing method for a broad band cholesteric liquid crystal film according to claim 1, wherein the polymerizable mesogen compound (a) is a compound represented by the following general formula (1):

wherein R$_1$, represents a hydrogen atom or a methyl group, and a is an integer of 1 to 5.

5. The manufacturing method for a broad band cholesteric liquid crystal film according to claim 1, wherein the coating thickness of the liquid crystal mixture is in the range of from 5 to 20 μm.

6. The manufacturing method for a broad band cholesteric liquid crystal film according to claim 1, wherein the polymerization temperature upon ultraviolet light irradiation is 140° C. or less.

7. The manufacturing method for a broad band cholesteric liquid crystal film according to claim 1, wherein the irradiation time of ultraviolet light is 5 minutes or less.

8. The manufacturing method for a broad band cholesteric liquid crystal film according to claim 1, wherein a mixing amount of the polymerizable chiral agent (b) is in the range of from 3 to 7 parts by weight relative to 100 parts by weight of a total amount of the polymerizable mesogen compound (a) and the polymerizable chiral agent (b).

9. The manufacturing method for a broad band cholesteric liquid crystal film according to claim 1, wherein a mixing amount of the photopolymerization initiator (c) is in the range of from 0.01 to 10 parts by weight relative to 100 parts by weight of a total amount of the polymerizable mesogen compound (a) and the polymerizable chiral agent (b).-

10. The manufacturing method for a broad band cholesteric liquid crystal film according to claim 1, wherein a mixing amount of the photopolymerization initiator (c) is in the range of from 0.05 to 5 parts by weight relative to 100 parts by weight of a total amount of the polymerizable mesogen compound (a) and the polymerizable chiral agent (b).

* * * * *